United States Patent [19]

Buma

[11] Patent Number: 5,342,079
[45] Date of Patent: Aug. 30, 1994

[54] CONTROL APPARATUS FOR VEHICLE SUSPENSION MECHANISM

[75] Inventor: Shuuichi Buma, Toyota, Japan

[73] Assignee: Toyota Jidosha Kabushiki Kaisha, Toyota, Japan

[21] Appl. No.: 37,400

[22] Filed: Mar. 26, 1993

[30] Foreign Application Priority Data

Mar. 27, 1992 [JP] Japan .................................. 4-071141

[51] Int. Cl.$^5$ ............................................. B60G 11/26
[52] U.S. Cl. ............................ 280/707; 364/424.05
[58] Field of Search ................... 280/707; 364/424.05

[56] References Cited

U.S. PATENT DOCUMENTS

| | | |
|---|---|---|
| 4,468,050 | 8/1984 | Woods et al. . |
| 4,696,489 | 9/1987 | Fujishiro et al. . |
| 4,714,271 | 12/1987 | Buma et al. . |
| 4,856,815 | 8/1989 | Tanaka et al. ...................... 280/707 |
| 4,970,645 | 11/1990 | Adachi et al. . |

FOREIGN PATENT DOCUMENTS

| | | |
|---|---|---|
| 0114700 | 8/1984 | European Pat. Off. . |
| 0221486 | 5/1987 | European Pat. Off. . |
| 0222329 | 5/1987 | European Pat. Off. . |
| 0239831 | 10/1987 | European Pat. Off. . |
| 1430668 | 9/1969 | Fed. Rep. of Germany . |
| 60-148105 | 10/1985 | Japan . |
| 2216470 | 10/1989 | United Kingdom . |

OTHER PUBLICATIONS

Patent Abstracts of Japan, vol. 10, No. 265, (M-515), Sep. 10, 1986, JP-A-61 089 110, May 7, 1986, H. Masahiro.

Patent Abstracts of Japan, vol. 11, No. 272, (M-622), Sep. 4, 1987, JP-A-62 074 705, Apr. 6, 1987, M. Mitsuyasu, et al.

IEEE Transactions on Industrial Electronics and Control Instrumentation, vol. 35, No. 2, May 1988, pp. 193–200, M. Hirose, et al., "Toyota Electronic Modulated Air Suspension For The 1986 Soarer".

*Primary Examiner*—Brian L. Johnson
*Assistant Examiner*—Paul N. Dickson
*Attorney, Agent, or Firm*—Oblon, Spivak, McClelland, Maier & Neustadt

[57] ABSTRACT

An electric control apparatus for a vehicle suspension mechanism of which the spring constant and damping force can be controlled independently to one another, wherein a vertical displacement amount and a vertical velocity vector of the vehicle body are detected during travel of the vehicle, and wherein the spring constant of the suspension mechanism is increased in accordance with an increase of the vertical displacement amount of the vehicle body and decreased in accordance with an increase of the vertical velocity vector of the vehicle body while the damping force of the suspension mechanism is decreased in accordance with the increase of the vertical displacement amount of the vehicle body and increased in accordance with the increase of the vertical velocity vector of the vehicle body.

4 Claims, 10 Drawing Sheets

Fig. 6
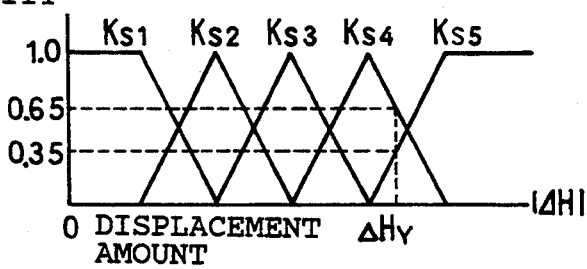
Fig. 7
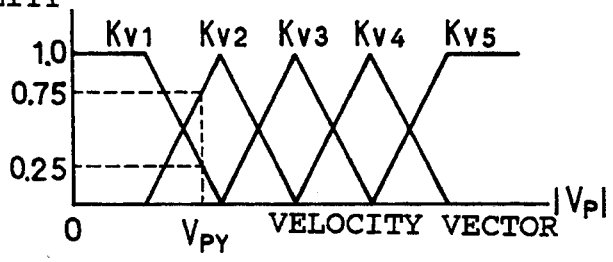
Fig. 8
|  | $K_{S1}$ | $K_{S2}$ | $K_{S3}$ | $K_{S4}$ | $K_{S5}$ |
|---|---|---|---|---|---|
| $K_{V1}$ | R3 | R3 | R4 | R5 | R5 |
| $K_{V2}$ | R3 | R3 | R3 | R4 | R5 |
| $K_{V3}$ | R2 | R3 | R3 | R3 | R4 |
| $K_{V4}$ | R1 | R2 | R3 | R3 | R3 |
| $K_{V5}$ | R1 | R1 | R2 | R3 | R3 |

Fig. 12
|  | Cs1 | Cs2 | Cs3 | Cs4 | Cs5 |
|---|---|---|---|---|---|
| Cv1 | R3 | R3 | R2 | R1 | R1 |
| Cv2 | R3 | R3 | R3 | R2 | R1 |
| Cv3 | R4 | R3 | R3 | R3 | R2 |
| Cv4 | R5 | R4 | R3 | R3 | R3 |
| Cv5 | R5 | R5 | R4 | R3 | R3 |
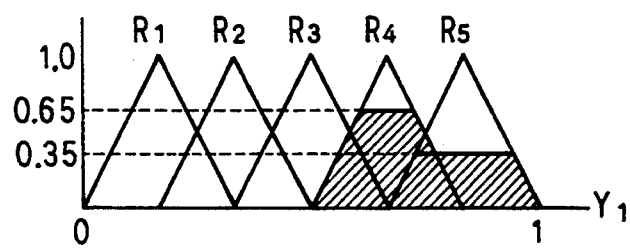
Fig. 13
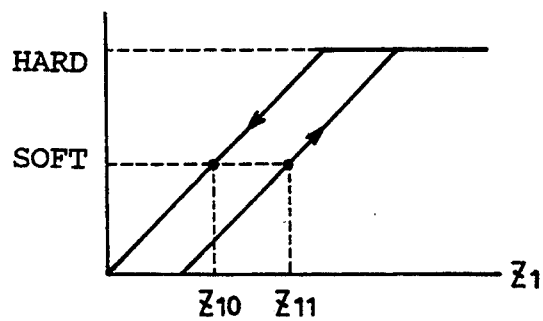
Fig. 14

Fig. 18
|      | Ks6 | Ks4 | Ks2 | Ks0 | Ks1 | Ks3 | Ks5 |
|------|-----|-----|-----|-----|-----|-----|-----|
| Kv6  | R4  | R3  | R2  | R1  | R2  | R2  | R3  |
| Kv4  | R5  | R4  | R3  | R2  | R3  | R3  | R3  |
| Kv2  | R6  | R5  | R4  | R3  | R4  | R5  | R6  |
| Kv0  | R7  | R6  | R5  | R4  | R5  | R6  | R7  |
| Kv1  | R6  | R4  | R4  | R4  | R5  | R6  | R7  |
| Kv3  | R3  | R3  | R3  | R3  | R4  | R5  | R6  |
| Kv5  | R3  | R2  | R2  | R2  | R3  | R4  | R5  |
Fig. 19
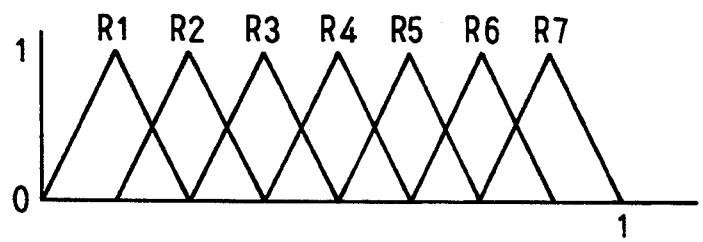
Fig. 20
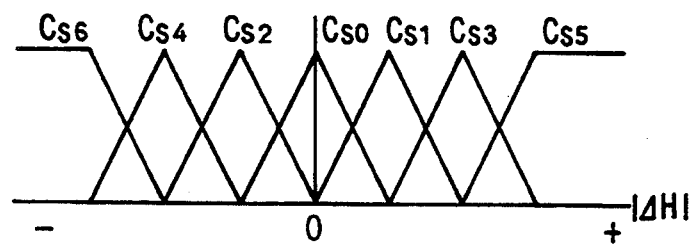

Fig. 21
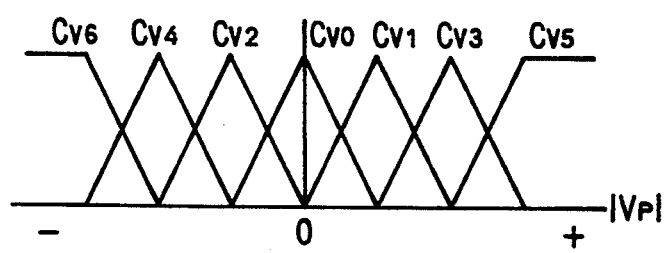
Fig. 22
|  | Cs6 | Cs4 | Cs2 | Cs0 | Cs1 | Cs3 | Cs5 |
|---|---|---|---|---|---|---|---|
| Cv6 | R4 | R5 | R6 | R7 | R6 | R3 | R2 |
| Cv4 | R3 | R4 | R5 | R6 | R5 | R3 | R2 |
| Cv2 | R2 | R3 | R4 | R5 | R4 | R3 | R2 |
| Cv0 | R1 | R2 | R3 | R4 | R4 | R3 | R2 |
| Cv1 | R2 | R3 | R4 | R5 | R4 | R3 | R2 |
| Cv3 | R2 | R3 | R5 | R6 | R5 | R4 | R3 |
| Cv5 | R2 | R3 | R6 | R7 | R6 | R5 | R4 |
Fig. 23
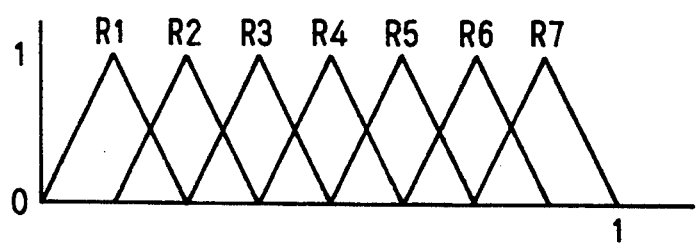

CONTROL APPARATUS FOR VEHICLE SUSPENSION MECHANISM

BACKGROUND OF THE INVENTION

1. Field of the Invention

The present invention relates to an electric control apparatus for a vehicle suspension mechanism of which the spring constant and damping force can be controlled independently to one another.

2. Discussion of the Prior Art

In Japanese Utility Model Lain-open Publication No. 60-148105, there has been proposed a vehicle suspension mechanism of which the spring constant can be adjusted by operation of a first actuator and of which the damping force can be adjusted by operation of a second actuator. In the suspension mechanism, however, the spring constant and damping force may not be adjusted in accordance with travel road surface conditions of the vehicle.

SUMMARY OF THE INVENTION

It is, therefore, a primary object of the present invention to provide an electric control apparatus for the vehicle suspension mechanism of capable of adjusting the spring constant and damping force in accordance with travel road surface conditions for enhancing the riding comfort of the vehicle and for restraining a posture change of the vehicle body.

According to the present invention, the object is accomplished by providing an electric control apparatus for a vehicle suspension mechanism of which the spring constant and damping force can be controlled independently to one another, the control apparatus comprising first detection means for detecting a vertical displacement amount of the vehicle body relative to a reference vehicle height and for producing a first signal indicative of the detected vertical displacement amount; second detection means for detecting a vertical velocity vector of the vehicle body and for producing a second signal indicative of the detected vertical velocity vector; and control means responsive to the first and second signals for increasing the spring constant of the suspension mechanism and decreasing the damping force of the suspension mechanism in accordance with an increase of the vertical displacement amount of the vehicle body and for decreasing the spring constant of the suspension mechanism and increasing the damping force of the suspension mechanism in accordance with an increase of the vertical velocity vector of the vehicle body.

BRIEF DESCRIPTION OF THE DRAWINGS

Additional objects, features and advantages of the present invention will be more readily appreciated from the following detailed description of a preferred embodiment thereof when taken together with the accompanying drawings, in which:

FIG. 6 is a graph showing a membership function for control of a spring constant with respect to a vertical displacement amount of the vehicle body;

FIG. 7 is a graph showing a membership function for control of the spring constant with respect to a vertical velocity vector of the vehicle body;

FIG. 8 is a map showing a relationship between the vertical displacement amount and the vertical velocity vector of the vehicle body;

FIG. 12 is a map showing a relationship between the vertical displacement amount and the vertical velocity vector, for control of the damping force;

FIG. 13 is a graph showing a membership function with respect to a damping force control value $Y_2$;

FIG. 14 is a graph showing a switchover point of the spring constant in relation to a spring constant control value $Z_1$;

FIG. 18 is a map showing a relationship between the vertical displacement amount and the vertical velocity vector, for control of the spring constant in the modification;

FIG. 19 is a graph showing a membership function with respect to a spring constant control value $Y_1$ in the modification;

FIG. 20 is a graph showing a membership function for control of a damping force with respect to the vertical displacement amount of the vehicle body in the modification;

FIG. 21 is a graph showing a membership function for control of the damping force with respect to the vertical velocity vector of the vehicle body in the modification;

FIG. 22 is a map showing a relationship between the vertical displacement amount and the vertical velocity vector, for control of the damping force in the modification;

FIG. 23 is a graph showing a membership function with respect to a damping force control value $Y_2$ in the modification;

DESCRIPTION OF THE PREFERRED EMBODIMENT

Figure 1:
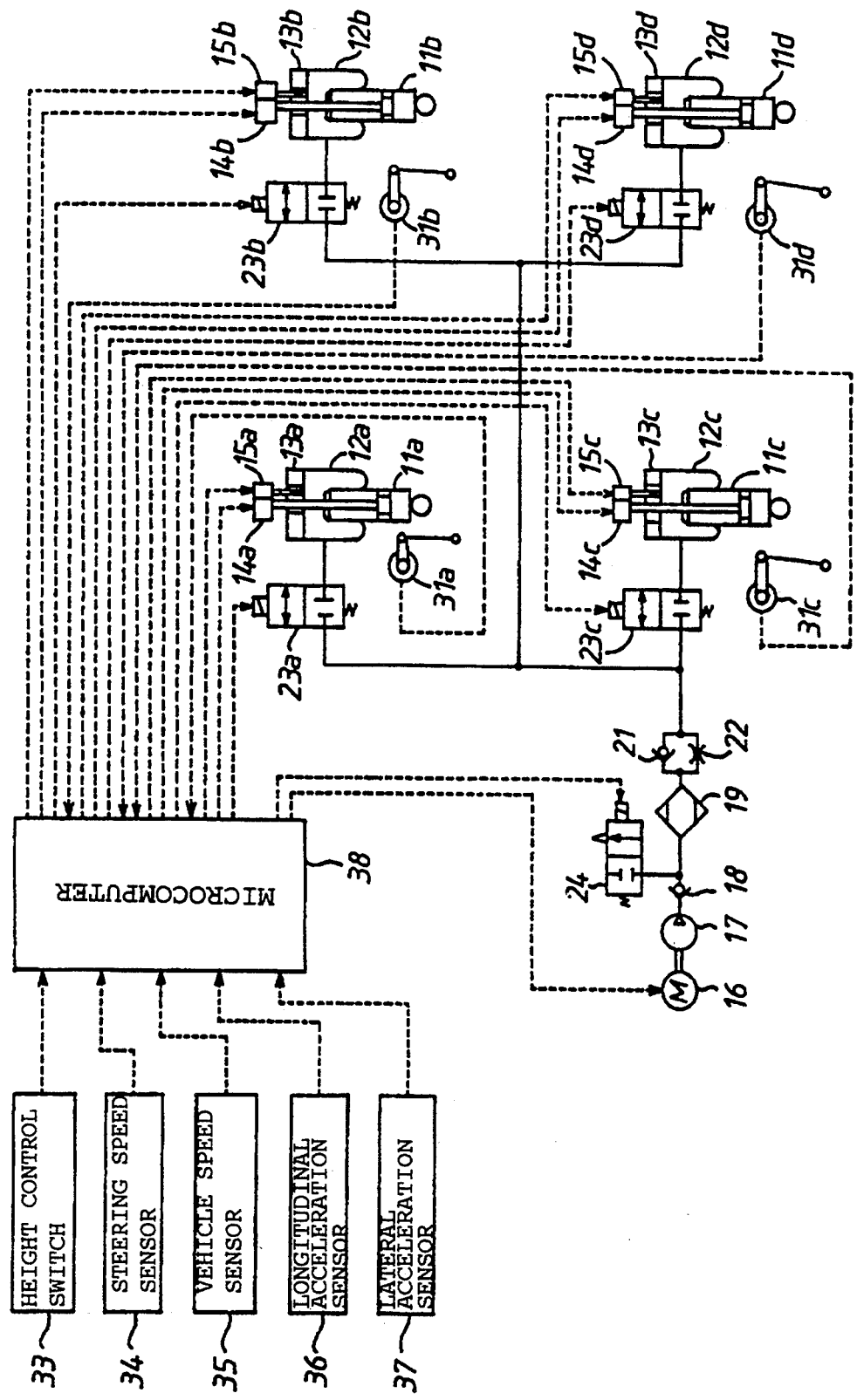
FIG. 1 is a schematic illustration of a control apparatus for a vehicle suspension mechanism in accordance with the present invention.

FIG. 1 of the drawings schematically illustrates an adjustable suspension mechanism of an automotive vehicle which includes shock absorbers $11a$–$11d$ disposed between the vehicle body structure and respective front and rear road wheels, and main air chambers $12a$–$12d$ and ancillary air chambers $13a$–$13d$ associated with the respective shock absorbers $11a$–$11d$. The shock absorbers $11a$–$11d$ are provided with electrically operated actuators $14a$–$14d$ which are arranged to operate each flow control valve of the shock absorbers $11a$–$11d$ for adjusting a damping force of the suspension mechanism at three steps (soft, medium, hard). The main air chambers $12a$–$12d$ are designed to continually adjust the vehicle height at the respective road wheels in accordance with an amount of air contained therein. In the case that the main air chambers $12a$–$12d$ are communicated with the ancillary air chambers $13a$–$13d$, the vehicle height at the respective road wheels can be adjusted in accordance with an amount of air contained in the ancillary air chambers $13a$–$13d$.

The ancillary air chambers $13a$–$13d$ are provided with normally closed changeover valves (not shown) which are arranged to be opened by activation of electrically operated actuators $15a$–$15d$ for providing air communication between the main air chambers $12a$–$12d$ and ancillary air chambers $13a$–$13d$. In operation, the ancillary air chambers $13a$–$13d$ cooperate with the main air chambers $12a$–$12d$ to adjust each spring constant of the suspension mechanism at two steps (soft and hard). Since the construction of the shock absorbers $12a$–$12d$, main air chambers $12a$–$12d$ and ancillary air chambers $13a$–$13d$ is well known (for example, disclosed in Japanese Utility Model Laid-open Publication No. 60-148105), further detailed explanation is abbreviated.

The main air chambers $12a$–$12d$ are connected to an air supply system which includes a compressor 17 arranged to be driven by an electric motor 16. The compressor 17 is connected to the respective main air chambers $12a$–$12d$ through a check valve 18, an air dryer 19, a check valve 21 and a fixed orifice 22 connected in parallel to one another, and normally closed solenoid changeover valves $23a$–$23d$ provided at the respective road wheels. When energized by an electric control signal applied thereto, the normally closed solenoid changeover valves $23a$–$23d$ are opened to communicate the main air chambers $12a$–$12d$ with the check valve 21 and orifice 22. In addition, a normally closed solenoid changeover valve 24 is connected to a connecting point of the check valve 18 and air dryer 19 to communicate the air dryer 19 with the atmospheric air when it has been energized.

Hereinafter, an electric control apparatus for the actuators $14a$–$14d$, $15a$–$15d$ and solenoid changeover valves $23a$–$23d$, 24 will be described in detail. The electric control apparatus includes vehicle height sensors $31a$–$31d$, a height control switch 33, a steering speed sensor 34, a vehicle speed sensor 35, a longitudinal acceleration sensor 36 and a lateral acceleration sensor 37. The vehicle height sensors $31a$–$31d$ are arranged to detect each height $H_{FL}$, $H_{FR}$, $H_{RL}$, $H_{RR}$ of the vehicle body at the road wheels for producing electric signals indicative of the detected vehicle height. The height control switch 33 is in the form of a changeover switch which is arranged to be switched over by manual operation of the driver for adjusting the vehicle height to a high level or a low level. The steering speed sensor 34 is arranged to detect rotational speed of a steering wheel of the vehicle for producing an electric signal indicative of the detected steering speed $\theta_V$ of the front road wheels.

The vehicle speed sensor 35 is arranged to detect travel speed of the vehicle for producing an electric signal indicative of the detected travel speed V. The longitudinal acceleration sensor 36 is arranged to detect acceleration of the vehicle in a fore-and-aft direction for producing an electric signal indicative of the detected acceleration $G_X$. The lateral acceleration sensor 37 is arranged to detect lateral acceleration of the vehicle for producing an electric signal indicative of the detected lateral acceleration $G_Y$. These sensors $31a$–$31d$, 34–37 and height control switch 33 are connected to a microcomputer 38 which includes a central processing unit of CPU, a read-only member or ROM and a random access memory or RAM. The CPU of computer 33 is designed to execute a control program shown by a flow chart in FIG. 2 for control of the actuators $14a$–$14d$, $15a$–$15d$ and solenoid changeover valves $23a$–$23d$, 24. The ROM of computer 38 is arranged to memorize the control program, data shown in FIGS. 3–5, 8, 12, 14, 15 and membership functions shown in FIGS. 6, 7, 9–11, 13, 14.

Hereinafter, the operation of the electric control apparatus will be described with reference to the flow chart of FIG. 2. Assuming that an ignition switch (not shown) of the vehicle has been closed, the CPU of computer 38 is activated to initiate execution of the control program at step 50 shown in FIG. 2 for controlling the vehicle height and for controlling the spring contant and damping force of the suspension mechanism. At step 51 of the control program, the CPU of computer 38 determines a target vehicle height H* in accordance with an operated condition of the height control switch 33. At the following step 52, the CPU of computer 38 produces a control signal for adjusting each vehicle height at the road wheels to the target vehicle height in a condition where the vehicle body does not move in a vertical direction. In this instance, the CPU of computer 38 reads out each vehicle height $H_{FL}$, $H_{FR}$, $H_{RL}$, $H_{RR}$ detected by the vehicle height sensors $31a$–$31d$ at the road wheels and applies the control signal to the solenoid changeover valves $23a$–$23d$, 24 for controlling them in such a manner that an average of the detected vehicle height becomes equal to the target vehicle height H*. Thus, the vehicle height $H_{FL}$, $H_{FR}$, $H_{RL}$, $H_{RR}$ at the respective road wheels is adjusted to the target vehicle height H* which is called a reference vehicle height hereinafter.

After adjustment of the vehicle height, the CPU of computer 38 reads out at step step 53 each vehicle height $H_{FL}$, $H_{FR}$, $H_{RL}$, $H_{RR}$ at the road wheels, steering angle speed $\theta_V$, vehicle speed V, longitudinal acceleration $G_X$ and lateral acceleration $G_Y$ respectively detected by the sensors $31a$–$31d$, 34, 35, 36 and 37. At the following step 54, the CPU of computer 38 determines control values $X_{HV}$, $X_{GX}$, $X_{GY}$ in accordance with the detected steering speed $\theta_V$, vehicle speed V, longitudinal acceleration $G_X$ and lateral accleration $G_Y$ with reference to the characteristic graphs shown in FIGS. 3 to 5. In this instance, the control value $X_{HV}$ is determined to be increased in accordance with an increase of the detected steering speed $\theta_V$ and vehicle speed V, while the control values $X_{GX}$, $X_{GY}$ each are determined to be increased in accordance with an increase of the detected longitudinal acceleration $G_X$ and lateral acceleration $G_Y$. When the program proceeds to step 55, the CPU of computer 38 executes calculation of the following equations (1) and (2) on a basis of the control values $X_{HV}, X_{GX}, X_{GY}$ to determine a spring constant control value $X_1$ and a damping force control value $X_2$.

$$X_1 = X_{HV} + X_{GX} + X_{GY} \quad (1)$$

$$X_2 = X_{GX} + X_{GY} \quad (2)$$

After processing at step 55, the CPU of computer 38 subtracts the reference vehicle height $H^*$ from the detected vehicle height $H_{FL}, H_{FR}, H_{RL}, H_{RR}$ to calculate vertical displacement amounts $\Delta H_{FL}(=H_{FL}-H^*)$, $\Delta H_{FR}(=H_{FR}-H^*)$, $\Delta H_{RL}(=H_{RL}-H^*)$, $\Delta H_{RR}(=H_{RR}-H^*)$. At the following step 57, the CPU of computer 38 calculates vertical velocity vector of the vehicle body $V_{PFL}(=dH_{FL}/dt)$, $V_{PFR}(=dH_{FR}/dt)$, $V_{PRL}(=dH_{RL}/dt)$, $V_{PRR}(=dH_{RR}/dt)$ by time-differentiation of the detected vehicle height $H_{FL}, H_{FR}, F_{RL}, H_{RR}$. Subsequently, the CPU of computer 38 determines at step 58 respective regions $K_{S1}, K_{S2}, K_{S3}, K_{S4}, K_{S5}$ related to absolute values $|\Delta H_{FL}|, |\Delta H_{FR}|, |\Delta H_{RL}|, |\Delta H_{RR}|$ of the calculated displacement amounts with respect to the spring constant on a basis of the memorized membership function shown in FIG. 6 and determines probability of the regions related to the absolute values. Assuming that one of the absolute values $|\Delta H_{FL}|, |\Delta H_{FR}|, |\Delta H_{RL}|, |\Delta H_{RR}|$ is a value $\Delta H_Y$, the CPU of computer 38 extracts all the regions $K_{S4}, K_{S5}$ related to the value $\Delta H_Y$ from the membership function and determines function values "0.65", "0.35" as the probability of the extracted regions. At the following step 59, the CPU of computer 38 determines respective regions $K_{V1}, K_{V2}, K_{V3}, K_{V4}, K_{V5}$ related to absolute values $|V_{PFL}|, |V_{PFR}|, |V_{PRL}|, |V_{PRR}|$ of the calculated vertical velocity vector of the vehicle body, with respect to the spring constant, on a basis of the memorized membership function shown in FIG. 7 and determines probability of the regions related to the absolute values. Assuming that one of the absolute values is a value $V_{PY}$, the CPU of computer extracts all the regions $K_{V1}, K_{V2}$ related to the value $V_{PY}$ from the membership function and determines function values "0.75", "0.25" as the probability of the extracted regions $K_{V1}, K_{V2}$.

Subsequently, the CPU of computer 38 determines at step 60 a spring constant control value $Y_1$ based on the determined regions and their probability. Assuming that the regions $K_{S4}, K_{S5}, K_{V1}, K_{V2}$ have been determined at step 58 and 59, the CPU of computer 39 determines the spring contant control value $Y_1$ on a basis of regions R4, R5 related to the regions $K_{S4}, K_{S5}, K_{V1}, K_{V2}$ with reference to the memorized data shown in FIG. 8 and determines the probability of the regions R4, R5. In addition, the order of regions R1-R5 represents increase of the spring constant control value.

Assuming that the regions $K_{S4}, K_{S5}$ have been determined in relation to the absolute value $|\Delta H_{FL}|(=\Delta H_Y)$ of the vertical displacement amount $\Delta H_{FL}$ and that the regions $K_{V1}, K_{V2}$ have been determined in relation to the absolute value $|V_{PFL}|(=V_{PY})$ of the vertical velocity vector $V_{PFL}$ of the vehicle body, regions R4, R5 corresponding to all the combination of the regions $K_{S4}, K_{S5}$ and $K_{V1}, K_{V2}$ are determined as the region related to the spring constant control value $Y_1$. The probability of the spring constant control value $Y_1$ related to the regions R4, R5 is determined as described below.

1) Since the region R4 is determined by the combination of regions $K_{S4}, K_{V2}$, the probability of the region $K_{S4}$ related to the value $H_Y$ is "0.75", and the probability of the region $K_{V2}$ related to the value $\Delta V_{PY}$ is "0.65", the probability of the region R4 related to the spring constant control value $Y_1$ is determined by the smaller value "0.65".

2) Since the region R5 is determined by each combination of the regions $K_{S4}, K_{V1}$; $K_{S5}, K_{V1}$; and $K_{S5}, K_{V2}$, the probability of the region R5 related to the spring constant control value $Y_1$ is first determined as "0.25", "0.25" and "0.35" in the same manner as described above. Finally, the largest probability "0.35" is selected as the probability of the region R5 related to the spring contant control value $Y_1$. Alternatively, larger one of the probability of the regions $K_{S1}-K_{S4}$ related to the value $\Delta H_Y$ or the probability of the regions $K_{V1}-K_{V2}$ related to the value $\Delta V_{PY}$ may be adapted to determine the probability of one of the regions R1-R5 related to the spring constant control value $Y_1$. In the case that the spring constant control value $Y_1$ is related to plural regions R1-R5, the smallest probability of the regions or an average probability of the regions may be adapted to determine the probability of the spring constant control value $Y_1$.

Figure 9:
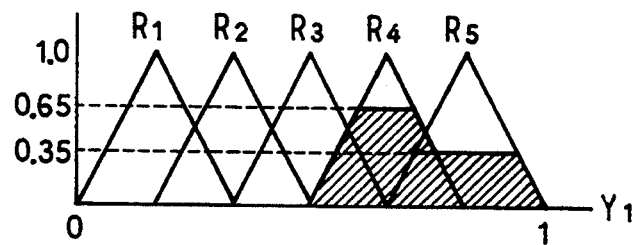
FIG. 9 is a graph showing a membership function with respect to a spring constant control value $Y_1$.

When the program proceeds to step 60, the CPU of computer 38 calculates a logical sum of the regions related to the spring constant control value $Y_1$ on a basis of the memorized membership function of FIG. 9 and calculates a center of gravity (0–1) of the calculated logical sum of the regions to finally determine a value indicative of the center of gravity as the spring constant control value $Y_1$. Assuming that the probability of respective regions R4, R5 related to the spring constant control value $Y_1$ is "0.65" and "0.35", the logical sum of the regions is represented by a hatched portion in FIG. 9, and the center of gravity (0–1) of the hatched portion is calculated as the spring constant control value $Y_1$. Although in this embodiment the spring constant control value $Y_1$ has been calculated by the center of gravity method, an area rule (or a load average method) may be adapted to calculate the spring constant control value $Y_1$. In such a case, values representing each center of gravity of regions R4, R5 are weighted with each area of the hatched portions of regions R4, F5, and the total areas of the hatched portions is subtracted from the sum of the weighted values.

Figure 10:
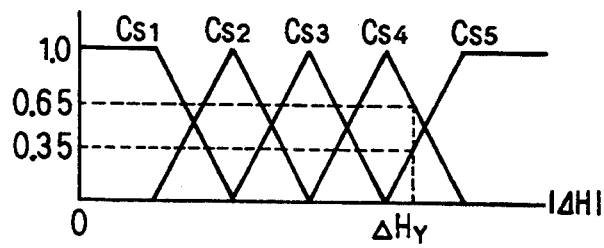
FIG. 10 is a graph showing a membership function for control of a damping force with respect to the vertical displacement amount of the vehicle body.
Figure 11:
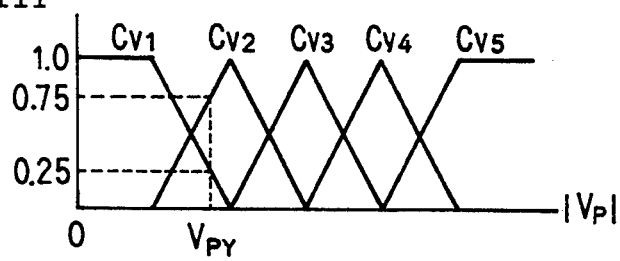
FIG. 11 is a graph showing a membership function for control of the damping force with respect to the vertical velocity vector of the vehicle body.

After processing at step 60, the CPU of computer 38 determines at step 61 each region ($C_{S1}, C_{S2}, C_{S3}, C_{S4}, C_{S5}$) related to absolute values $|\Delta H_{FL}|, |\Delta H_{FR}|, |\Delta H_{RL}|, |\Delta H_{RR}|$ of the detected vertical displacement amount $\Delta H_{FL}, \Delta H_{FR}, \Delta H_{RL}, \Delta H_{RR}$, with respect to the damping force, on a basis of the memorized membership function of FIG. 10 and determines probability of the regions. At the following step 62, the CPU of computer 38 determines each region ($C_{V1}, C_{V2}, C_{V3}, C_{V4}, C_{V5}$) related to absolute values $|V_{PFL}|, |V_{PFR}|, |V_{PRL}|, |V_{PRR}|$ of the detected vertical velocity vectors of the vehicle body $V_{PFL}, V_{PFR}, V_{PRL}, V_{PRR}$, with respect to the damping force, on a basis of the memorized membership function of FIG. 11 and determines probability of the regions.

When the program proceeds to step 63, the CPU of computer 38 determines a damping force control value $Y_2$ on a basis of the regions and probability determined at step 62. In this instance, regions R1-R5 related to the damping force control value $Y_2$ are determined on a basis of regions $C_{S4}$, $C_{S5}$, $C_{V1}$, $C_{V2}$ determined at step 61, 62 with reference to the memorized data of FIG. 12, and the probability of the regions is determined. In this embodiment, the order of regions R1–R5 represents increase of the damping force. Subsequently, the CPU of computer 38 calculates a logical sum of the regions related to the damping force control value $Y_2$ on a basis of the memorized membership function of FIG. 13 and calculates a center of gravity (0–1) of the logical sum of the regions to finally determine a value indicative of the center of gravity as the damping force control value $Y_2$.

After determination of the spring constant control value $Y_1$ and the damping force control value $Y_2$ by a fuzzy inference at step 56–63, the CPU of computer 38 calculates the following equations (3) and (4) on a basis of the control values $Y_1$, $Y_2$ and the control values $X_1$, $X_2$ determined at step 54, 55 to determine a spring constant control value $Z_1$ and a damping force control value $Z_2$ for the respective road wheels.

$$Z_1 = X_1 + Y_1 \quad (3)$$

$$Z_2 = X_2 + Y_2 \quad (4)$$

Thereafter, the CPU of computer 38 produces at step 65 control signals respectively indicative of the spring constant control value $Z_1$ and the damping force control value $Z_2$ and applies them to the actuators 15a–15d and 14a–14d. Thus, the actuators 15a–15d and 14a–14d are activated to adjust each spring constant of the air chambers 12a–12d and 13a–13d in accordance with the spring constant control value $Z_1$ and to adjust each damping force of the shock absorbers 11a–11d in accordance with the damping force control value $Z_2$. In this embodiment, as shown in FIG. 14, the adjustment of the spring constant is applied with hysteresis by comparing the spring constant control value $Z_1$ with predetermined values $Z_{10}$, $Z_{11}$. Assuming that the main air chambers 12a–12d are communicated with the ancillary air chambers 13a–13d in adjustment of the spring constant, the actuators 15a–15d are activated to interrupt the communication between the air chambers 12a–12d and 13a–13d when the spring constant control value $Z_1$ becomes larger than the predetermined value $Z_{11}$. Thus, each spring constant of the air chambers 12a–12d and 13a–13d is switched over from a soft condition to a hard condition. If the main air chambers 12a–12d are disconnected from the ancillarly air chambers 13a–13d in adjustment of the spring constant, the actuators 15a–15d are activated to communicate the main air chambers 12a–12d with the ancillary air chambers 13a–13d when the spring constant control value $Z_1$ becomes smaller than the predetermined value $Z_{10}$. Thus, each spring constant of the air chambers 12a–12d and 13a–13d is switched over from the hard condition to the soft condition.

Figure 15:
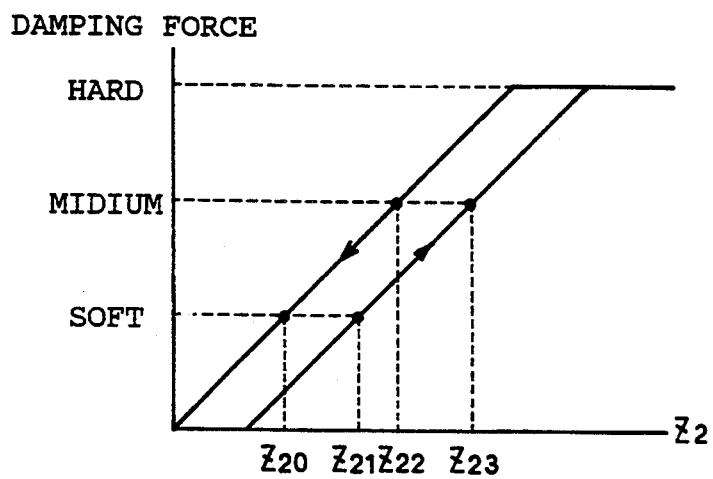
FIG. 15 is a graph showing a switchover point of the damping force in relation to the a damping force control value $Z_2$.
Figure 16:
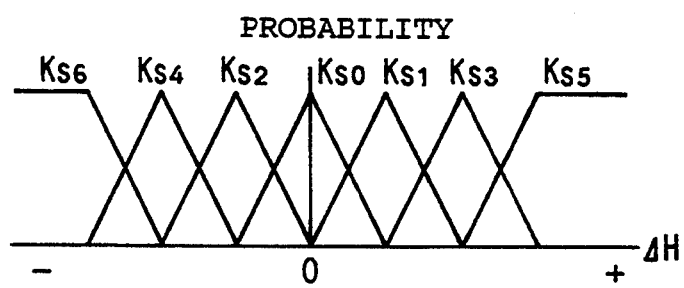
FIG. 16 is a graph showing a membership function for control of a spring constant with respect to a vertical displacement amount of the vehicle body in a modification of the present invention.
Figure 17:
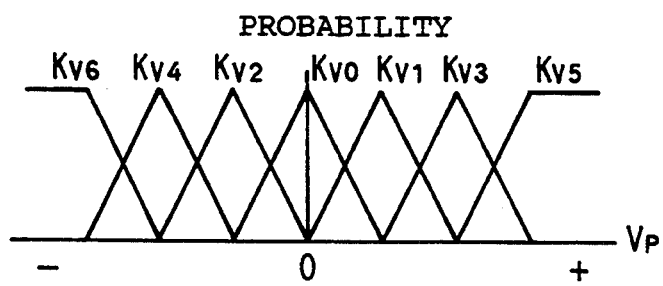
FIG. 17 is a graph showing a membership function for control of the spring constant with respect to a vertical velocity vector of the vehicle body.
Figure 24:
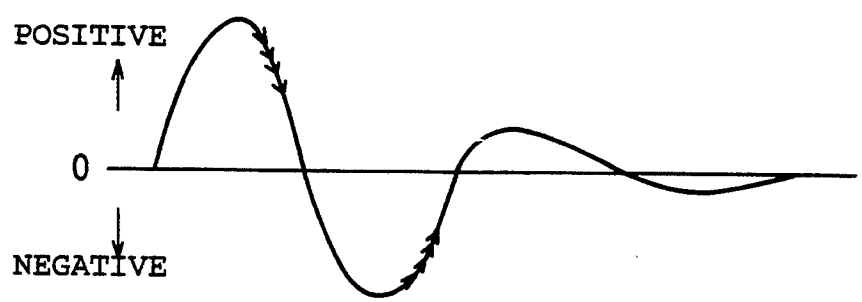
FIG. 24 is a graph showing vibration of the vehicle body.

As shown in FIG. 15, the adjustment of the damping force is also applied with hysteresis by comparing the damping force control value $Z_2$ with predetermined values $Z_{20}$–$Z_{23}$. Assuming that each damping force of shock absorbers 11a–11d is in a soft condition or a medium condition, the actuators 14a–14d are activated to switch over the damping force of shock absorbers 11a–11d from the soft condition to the medium condition or vice versa when the damping force control value $Z_2$ becomes larger than the predetermined value $Z_{21}$ or $Z_{23}$. If each damping force of shock absorbers 11a–11d is in a hard condition or the medium condition, the actuators 14a–14d are activated to switch over the damping force of shock absorbers 11a–11d from the hard condition to the medium condition or vice versa when the damping force control value $Z_2$ becomes smaller than the predetermined value $Z_{22}$ or $Z_{20}$.

As is understood from the above description, the processing at step 54, 55 is conducted to increase the spring constant control value $X_1$ in accordance with an increase of the vehicle speed V and steering speed $\theta_V$ and to increase the spring constant control value $X_1$ and damping force control value $X_2$ in accordance with an increase of the longitudinal acceleration $G_X$ and lateral acceleration $G_Y$. Thus, the spring constant and damping force of the suspension mechanism are increased in accordance with an increase of both the spring constant control value $X_1$ and damping force control value $X_2$. This is effective to restrain a posture change of the vehicle body in turning and acceleration of the vehicle.

Figure 25:
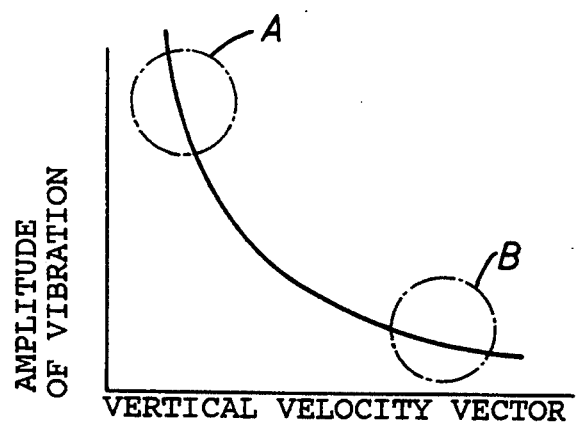
FIG. 25 is a graph showing an amplitude of vibration of the vehicle in relation to a vertical velocity vector of the vibration.

When the vehicle passes over a large projection on a relatively flat road, the vehicle body vibrates at a large amplitude of about 1–2 Hz near a resonance frequency of the unsprung mass of the vehicle body. In this instance, the amplitude of vibration is large but the velocity vector of vibration is small. (see a circle A in FIG. 25). Thus, the spring constant control value $Y_1$ is set as a large value by processing at step 60, while the damping force control value $Y_2$ is set as a small value by processing at step 63. This is effective to adjust the spring constant of the suspension mechanism to the hard condition for restraining a posture change of the vehicle body and to adjust the damping force of the suspension mechanism to the soft condition for enhancing the riding comfort of the vehicle.

When the vehicle travels on a rough road, the vehicle body vibrates along the rough surfaces of the travel road. In this instance, the amplitude of vibration is small while the vertical velocity vector of vibration is high. (see a circle B in FIG. 25) Thus, the spring constant control value $Y_1$ is set as a small value by processing at step 60, while the damping force control value $Y_2$ is set as a large value by processing at step 63. This is effective to adjust the spring constant of the suspension mechanism to the soft condition for enhancing the riding comfort of the vehicle and to adjust the damping force of the suspension mechanism to the hard condition for restraining a posture change of the vehicle body.

In a modification of the embodiment, the ROM of computer 38 may be arranged to memorize membership functions and data of FIGS. 16–19 for control of the spring constant instead of the membership functions and data of FIGS. 6–9 and to memorize membership functions and data of FIGS. 20–23 for control of the damping force in stead of the membership functions and data of FIGS. 10–13. In the membership functions of FIGS. 16 and 17, regions $K_{S0}$, $K_{V0}$ are allotted respectively in relation to a vertical displacement amount $\Delta H$ of about "0" and a vertical velocity vector $V_P$ of about "0", regions $K_{S1}$, $K_{S3}$, $K_{S5}$; $K_{V1}$, $K_{V3}$, $K_{V5}$ are allotted respectively in relation to positive vertical displacement amounts $\Delta H$ and positive vertical velocity vectors $V_P$, and regions $K_{S2}$, $K_{S4}$, $K_{S6}$; $K_{V2}$, $K_{V4}$, $K_{V6}$ are allotted respectively in relation to negative vertical displacement amounts $\Delta H$ and negative vertical velocity vectors $V_P$. In the above membership functions, the positive value represents an upward direction, while the negative value represents a downward direction. In the map of FIG. 18 and the membership function of FIG. 19, the order of regions R1–R7 represents increase of the spring constant control value $Y_1$. In this case, the spring constant control value $Y_1$ is determined to be increased in accordance with an increase of an absolute value $|\Delta H|$ of the vertical displacement amount $\Delta H$ and to be decreased in accordance with an increase of an absolute value $|\Delta V_P|$ of the velocity vector $V_P$. In a condition where the vertical displacement amount $\Delta H$ and velocity vector $V_P$ are different in their signs, the region related to the spring constant control value $Y_1$ represents a smaller value than that in a condition where the vertical displacement amount $\Delta H$ and velocity vector $V_P$ are identical in their signs.

In the membership functions of FIGS. 20 and 21, regions $C_{S0}$, $C_{V0}$ are allotted respectively in relation to the vertical displacement amount $\Delta H$ of about "0" and the vertical velocity vector $V_P$ of about "0", regions $C_{S1}$, $C_{S3}$, $C_{S5}$; $C_{V1}$, $C_{V3}$, $C_{V5}$ are allotted respectively in an increase order of the positive vertical displacement amount $\Delta H$ and an increase order of vertical velocity vector $V_P$, and regions $C_{S2}$, $C_{S4}C_{S6}$; $C_{V2}$, $C_{V4}$, $C_{V6}$ are allotted respectively in a decrease order of the negative vertical displacement amount $\Delta H$ and a decrease order of velocity vector $V_P$. In the map of FIG. 22 and the function of FIG. 23, the order of regions R1–R7 represents increase of the damping force control value $Y_2$. In this case, the region related to the damping force control value $Y_2$ represents a small value in accordance with an increase of an absolute value $|\Delta H|$ of the vertical displacement amount $\Delta H$ and represents a large value in accordance with an increase of an absolute value $|\Delta V_P|$ of the vertical velocity vector $V_P$. In a condition where the vertical displacement amount $\Delta H$ and velocity vector $V_P$ are different in their signs, the region related to the damping force control value $Y_2$ represents a smaller value than that in a condition where the vertical displacement amount $\Delta H$ and velocity vector $V_P$ are identical in their signs.

Figure 2:
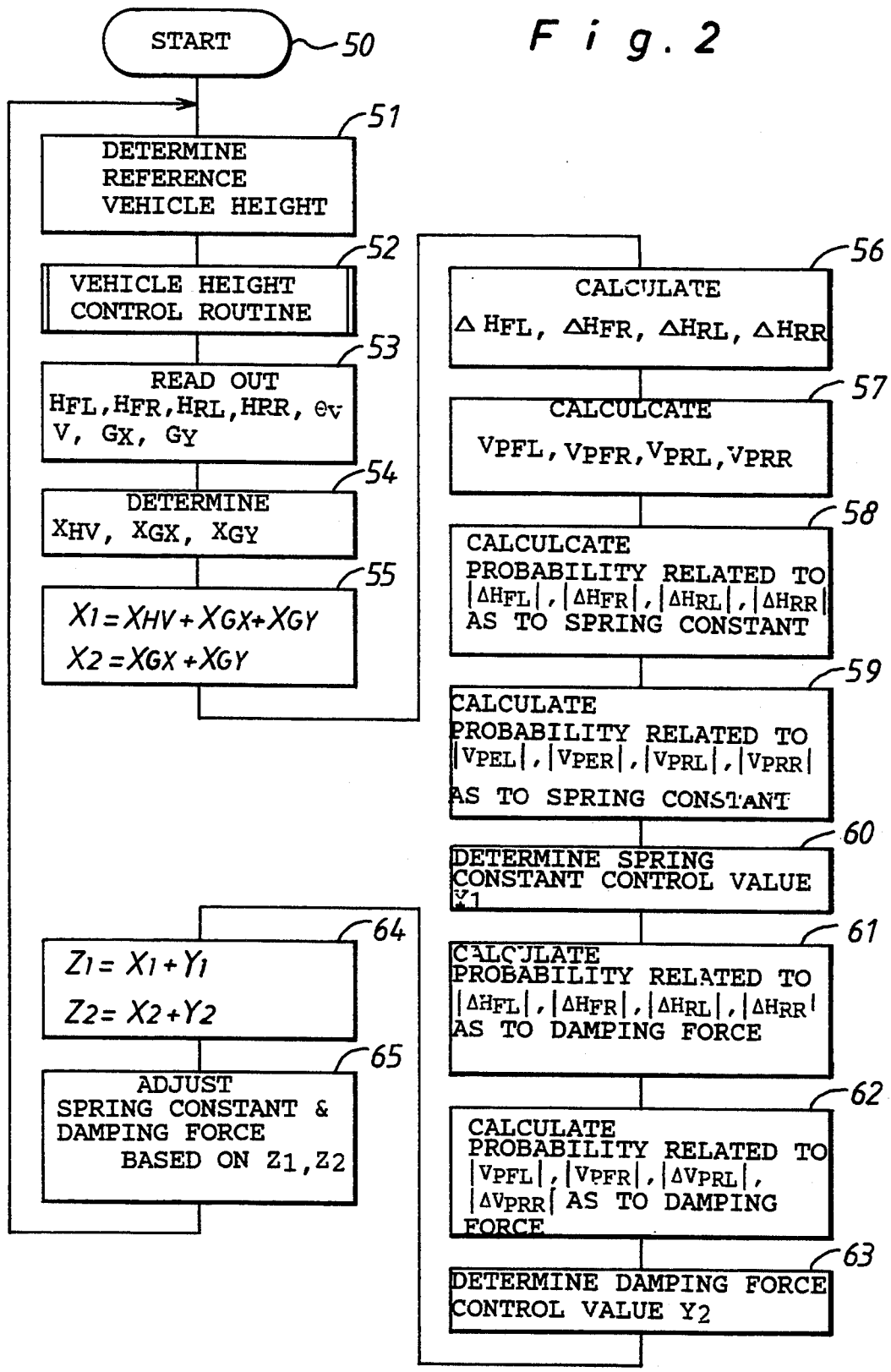
FIG. 2 is a flow chart of a control program executed by a microcomputer shown in FIG. 1.
Figure 3:
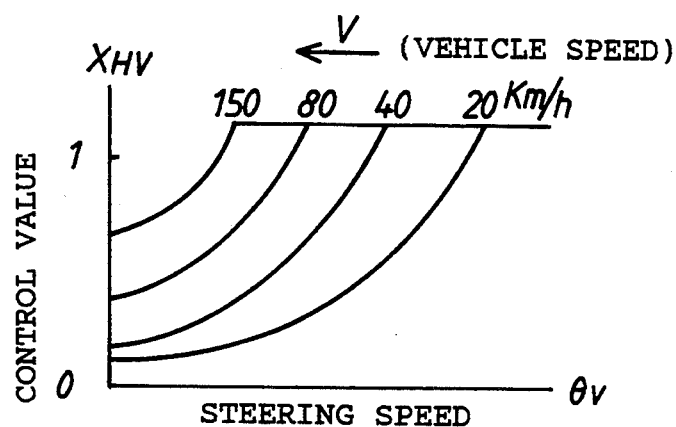
FIG. 3 is a graph showing a control value $X_{HV}$ in relation to a steering speed and a vehicle speed.
Figure 4:
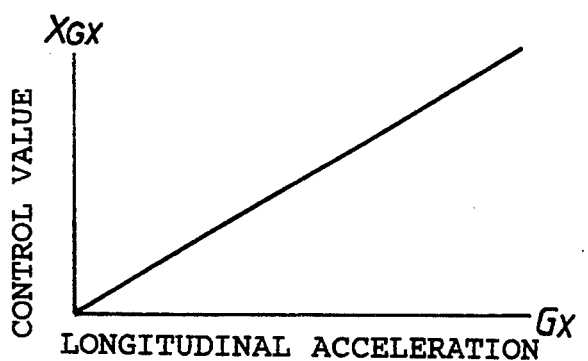
FIG. 4 is a graph showing a control value $X_{GX}$ in relation to a longitudinal acceleration of the vehicle.
Figure 5:
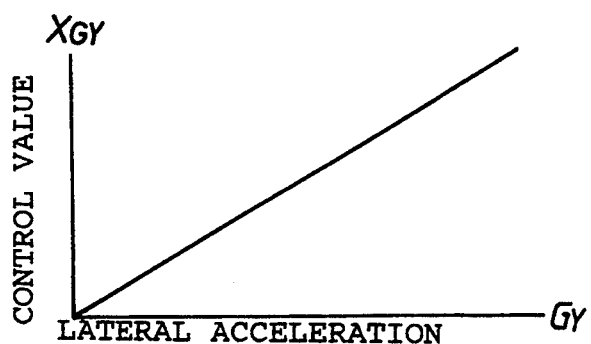
FIG. 5 is a graph showing a control value $X_{GY}$ in relation to a lateral acceleration of the vehicle.

In this modification, the respective regions $(K_{S0}-K_{S6})$, $(K_{V0}-K_{V6})$, $(C_{S0}-C_{S6})$, $(C_{V0}V_{V6})$ and their probability are determined on a basis of the vertical displacement amounts $\Delta H_{FL}$, $\Delta H_{FR}$, $\Delta H_{RL}$, $\Delta H_{RR}$ by processing at step 58, 59, 61, 62 of FIG. 2. The other processing is substantially the same as that in the above embodiment. Under control of the modification, the spring constant control value $Y_1$ is set as a large value in accordance with an increase of an absolute value $|\Delta H|$ of the vertical displacement amount $\Delta H$ of the vehicle body, whereas the damping force control valve $Y_2$ is set as a small value in accordance with the increase of the absolute value $|\Delta H|$. The spring constant control value $Y_1$ is set as a small value in accordance with an increase of an absolute value $|V_P|$ of the vertical velocity vector $V_P$ of the vehicle body, whereas the damping force control value $Y_2$ is set as a large value in accordance with the increase of the absolute value $|V_P|$. Thus, the same effect as that in the above embodiment can be expected. In a condition where the vehicle height tends to return to the reference height H*, the regions related to the spring constant control value $Y_1$ and damping force control value $Y_2$ each are determined to represent a smaller value than that in a condition where the vehicle height tends to differ from the reference height H*. This is effective to decrease the spring constant control value and damping force control value for reducing the restoring force of the vehicle body toward the reference height H* and for quickly converging the vibration of the vehicle body.

Although in the above embodiment the height control switch has been adapted to adjust the reference height of the vehicle body, the reference height may be maintained at a constant level without providing the height control switch.

What is claimed is:

1. An electric control apparatus for a vehicle suspension mechanism of which the spring constant and damping force can be controlled independently to one another, comprising:

first detection means for detecting a vertical displacement amount of the vehicle body relative to a reference vehicle height and for producing a first signal indicative of the detected vertical displacement amount;

second detection means for detecting a vertical velocity vector of the vehicle body and for producing a second signal indicative of the detected vertical velocity vector;

control means responsive to the first and second signals for increasing the spring constant of the suspension mechanism and decreasing the damping force of the suspension mechanism in accordance with an increase of the vertical displacement amount of the vehicle body and for decreasing the spring constant of the suspension mechanism and increasing the damping force of the suspension mechanism in accordance with an increase of the vertical velocity vector of the vehicle body.

2. An electric control apparatus for a vehicle suspension mechanism as claimed in claim 1, wherein said first detection means comprises a vehicle height sensor arranged to detect a vehicle height of the vehicle body and for producing an electric signal indicative of the detected vehicle height; means for determining a reference vehicle height during stopping of the vehicle; and means responsive to the electric signal from said vehicle height sensor for calculating a difference between the detected vehicle height and the reference vehicle height.

3. An electric control apparatus for a vehicle suspension mechanism as claimed in claim 2, wherein said second detection means comprises means responsive to the electric signal from said vehicle height sensor for calculating a vertical velocity vector of the vehicle body by time-differentiation of the detected height.

4. A method of controlling a vehicle suspension mechanism of which the spring constant and damping force can be controlled independently to one another; comprising the steps of:

detecting a vertical displacement amount and a vertical velocity vector of the vehicle body during travel of the vehicle;

increasing the spring constant of the suspension mechanism and decreasing the damping force of the suspension mechanism in accordance with an increase of the vertical displacement amount of the vehicle body; and decreasing the spring constant of the suspension mechanism and increasing the damping force of the suspension mechanism in accordance with an increase of the vertical velocity vector of the vehicle body.

* * * * *